(12) United States Patent
Fletcher et al.

(10) Patent No.: US 9,122,797 B2
(45) Date of Patent: Sep. 1, 2015

(54) DETERMINISTIC REMOTE INTERFACE UNIT EMULATOR

(75) Inventors: Mitch Fletcher, Glendale, AZ (US);
Thom Kreider, Glendale, AZ (US);
John Dawson, Phoenix, AZ (US); Julee Clelland, Anthem, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 557 days.

(21) Appl. No.: 12/569,641

(22) Filed: Sep. 29, 2009

(65) Prior Publication Data

US 2010/0082323 A1   Apr. 1, 2010

Related U.S. Application Data

(60) Provisional application No. 61/101,259, filed on Sep. 30, 2008.

(51) Int. Cl.
*G06F 9/455* (2006.01)
*G06F 11/36* (2006.01)

(52) U.S. Cl.
CPC .................... *G06F 11/3664* (2013.01)

(58) Field of Classification Search
CPC .............. G06F 11/261; G06F 11/3664; G06F 17/5027; G06F 9/45504; G06F 9/3017; G06F 11/3457
USPC .................................... 703/23, 24, 25, 26, 27
See application file for complete search history.

(56) References Cited

U.S. PATENT DOCUMENTS

| | | | |
|---|---|---|---|
| 5,017,141 A | | 5/1991 | Relf et al. |
| 5,101,344 A | * | 3/1992 | Bonet et al. .................... 712/234 |
| 5,260,874 A | * | 11/1993 | Berner et al. .................... 701/36 |
| 5,386,518 A | | 1/1995 | Reagle et al. |
| 5,400,376 A | | 3/1995 | Trudeau |
| 5,561,775 A | * | 10/1996 | Kurosawa et al. .............. 712/23 |
| 5,758,107 A | | 5/1998 | Robles et al. |
| 5,808,921 A | * | 9/1998 | Gold et al. .................... 702/108 |
| 6,115,654 A | | 9/2000 | Eid et al. |
| 6,654,877 B1 | * | 11/2003 | Huck et al. .................... 712/229 |
| 7,032,228 B1 | * | 4/2006 | McGillis et al. .............. 719/321 |
| 7,096,285 B2 | | 8/2006 | Ellerbrock et al. |
| 7,203,630 B2 | | 4/2007 | Kolb et al. |
| 7,284,144 B2 | | 10/2007 | Surico |
| 7,607,070 B2 | * | 10/2009 | Clark et al. .................... 714/776 |
| 2003/0018883 A1 | | 1/2003 | Jourdan |
| 2004/0024580 A1 | * | 2/2004 | Salmonsen et al. ............. 703/27 |
| 2005/0210275 A1 | * | 9/2005 | Homing et al. ............... 713/190 |
| 2006/0123244 A1 | * | 6/2006 | Gheorghescu et al. ....... 713/188 |

(Continued)

*Primary Examiner* — Aniss Chad
*Assistant Examiner* — Andre Pierre Louis
(74) *Attorney, Agent, or Firm* — Ingrassia Fisher & Lorenz, P.C.

(57) ABSTRACT

Devices systems and methods are provided for providing a deterministic remote interface unit (RIU) based on a finite state machine. The RIU emulator uses a sequence controller that is configured to receive a synchronization input and to execute a fixed list of unconditional commands in an invariable order of execution based solely upon the synchronization input. The RIU emulator also uses pre-defined or pre-certified data structures that are specific to one or more interface devices to successfully execute the at least one unconditional command of the plurality when encountered in the invariable order. As such, peripheral devices may be added, removed or updated without recertification by merely inserting pre-certified data structures into memory or deleting them.

20 Claims, 3 Drawing Sheets

(56) References Cited

U.S. PATENT DOCUMENTS

| | | |
|---|---|---|
| 2006/0259166 A1 | 11/2006 | Hoffman et al. |
| 2008/0127114 A1* | 5/2008 | Vasudevan .................... 717/129 |
| 2008/0133105 A1 | 6/2008 | Harris et al. |
| 2009/0070791 A1* | 3/2009 | Gissel et al. .................. 719/330 |

* cited by examiner

DETERMINISTIC REMOTE INTERFACE UNIT EMULATOR

PRIORITY CLAIM

The present application claims priority from provisional application 61/101,259 filed on Sep. 30, 2008 under 35 U.S.C. §119 and is hereby incorporated by reference in its entirety.

TECHNICAL FIELD

The present invention generally relates to the command and control of a generic set of computer peripherals by controlling the interface device between a computer and each of the set of peripherals. More specifically the present invention relates to command and control that is accomplished within a remote interface unit emulator that comprises a finite state machine, a microcomputer bus controller, and a set of zero or more interface circuit boards connected to peripheral devices.

BACKGROUND

A single board computer or other controller typically communicates with various peripheral devices through an interface device connected through a backplane or a bus, which may be a serial or parallel implementation. Most backplanes include a number of slots or connectors into which a circuit board is physically plugged. Each circuit board is in turn associated with one or more peripheral devices. A circuit board is either physically configured with jumpers and switches or contains firmware that may be configured using software instructions received from the single board computer through the backplane or bus.

Once configured, an interface device typically requires a software driver located in the single board computer, which allows the computer's operating system to communicate with and control the interface device. The interface device in turn interfaces with and controls the peripheral device. At times, the addition or change of a peripheral device will require a new interface device which would then typically require a new device driver to be installed before the peripheral device and interface device can be operated by the single board computer.

Conventionally, computing device with a robust level of intelligence is usually required to communicate with each interface device. This allows data to be received, stored, transmitted, and appropriately formatted for transmission to and from the appropriate destinations via a backplane or bus. Commonly such functions were conducted by processors or controllers with data formatting capability that allowed communication of command/response logic instructions that were created by a complex computer program. The program was then compiled and linked to a board support package library function.

For highly sophisticated applications such as for avionics, the controller may be required to be inspected and its conditional logic certified to be error free. Any time there is a new interface device function a new microprocessor control program must be created, debugged, and certified. This makes installing upgrades and executing reconfigurations costly and time consuming. Hence, there is a need for a computing model that emulates the performance of a conventional controller, but without the required installation of new drivers when new interface devices are introduced.

BRIEF SUMMARY

A RIU emulator is provided that includes a memory containing a first data structure that comprises a plurality of unconditional commands in an invariable order of execution and a second data structure containing interface device specific data required by at least one unconditional command of the plurality. The RIU emulator also includes a sequence controller configured to receive a synchronization input. The sequence controller is further configured to execute each unconditional command of the plurality in the invariable order of execution based solely upon the synchronization input using the interface device specific data to successfully execute one "frame" or "set" of unconditional command of the plurality when encountered in the invariable order. A frame of unconditional commands is run as a group as quickly as possible. Frame "to and from" timing/pacing is controlled by the external clock. The sequence controller is in operable communication with the memory device.

A method is provided for emulating a remote interface unit (RIU). The method comprises the steps of receiving a clock signal, executing a frame of unconditional commands in an invariable order, the execution being triggered at least in part by the clock signal and copying zero or more data structure from a memory device within the RIU to a communication bus as a result of executing the plurality of unconditional commands, wherein the first data structure contains data required by a remote electronic device to perform a function.

A system is provided for interfacing a first digital component with a second digital component. The system includes a buffer memory configured to store a plurality of data values being transferred between the first digital component and the second digital component. A first data structure is configured to store data specific to the second digital component and a second data structure is configured to store a plurality of unconditional commands in an invariable order of execution. The system also includes a state machine that is configured to receive the plurality of data values from the first digital component into the buffer memory and to copy the plurality of data values from the buffer memory to the second digital component in accordance with at least one of a plurality of unconditional commands. At least one of the plurality unconditional commands requires the data specific to the second digital component in order to control the second digital component.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention, the application, or the uses of the invention. Furthermore, there is no intention to be bound by any theory presented in the preceding background or the following detailed description. Nor is there an intention to be bound by a particular data source.

The subject matter presented herein discloses methods, apparatus and systems featuring a remote interface unit (RIU) emulator that controls an internal interface device, which in turn controls an external peripheral device. The RIU emulator may be a finite state machine, which contains no conditional programming because it only executes a list of unconditional commands found in various buffer memories. This emulator can be easily certified to be error free, is easily updated and only requires a one time certification if such certification is necessary. Although presented in terms of an avionics implementation, after reading the disclosure herein it will be appreciated by those of ordinary skill in the art that the subject matter disclosed herein may be applied to other vehicle control systems such robotic control systems, ship control systems, an automotive control system as well as various manufacturing plants and building control systems.

In brief, the RIU comprises a controller implemented as a simple logic sequence controller, or software operating within a microprocessor, that has minimal operational intelligence. Although ancillary to the embodiments disclosed herein, the controller itself may only contain a minimal set of instructions needed to transmit information to a backplane or a bus with timing constraints, store data to a memory, receive information from the bus, and conduct any necessary handshake or data verification protocols needed to accomplish the sending and receiving of the data. Other than this minimal operational programming, the controller does not execute conditional logic to control the interface device.

Figure 1:
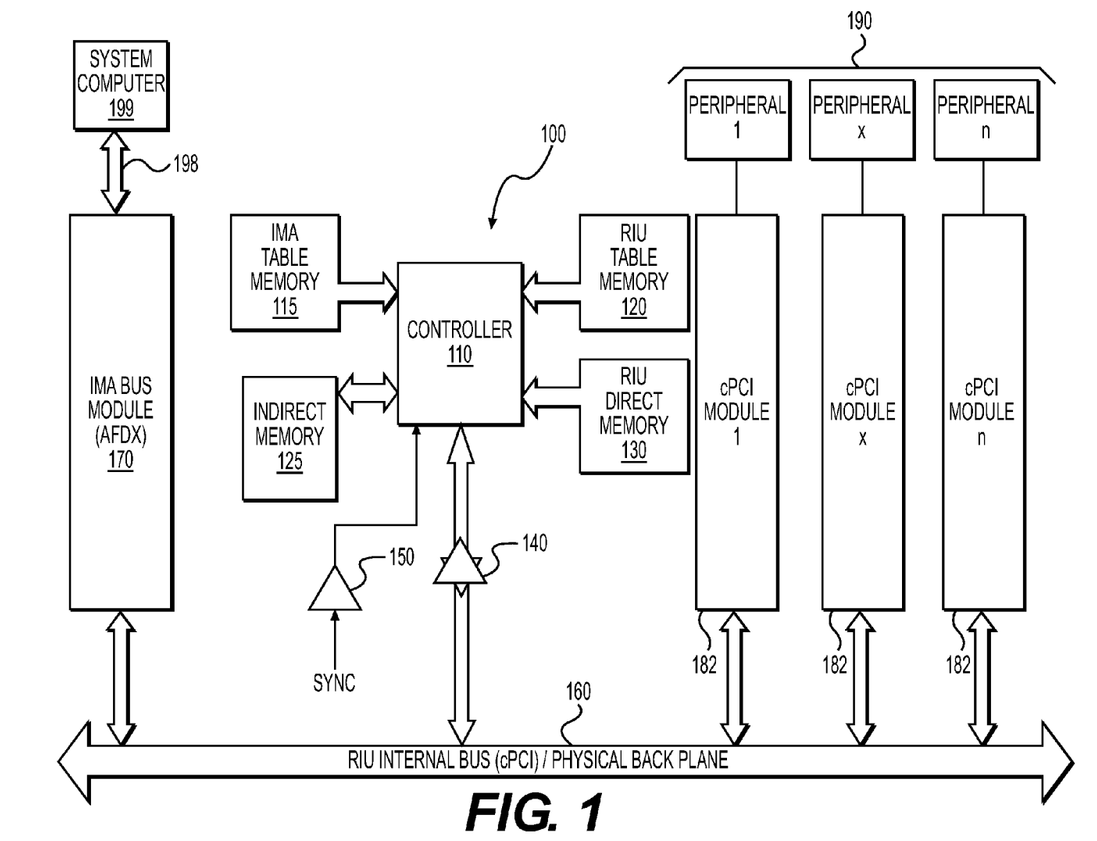
FIG. 1 is a functional block diagram of an exemplary remote interface unit emulator.

Turning to FIG. 1, a functional block diagram of an exemplary RIU emulator 100 is depicted. The RIU emulator 100 controls peripherals 190 (1-n) by causing changes in the states of the input/output interface circuit devices 182 (1-n) via a backplane or bus 160. In an exemplary embodiment, the backplane or bus 160 comprises, but is not limited to, a compact peripheral component interconnect ("cPCI") backplane. An input/output cPCI interface device 182 may be a cPCI card. The cPCI backplane 160 communicates with any number of cPCI devices 182 (1-n) that may range in number from 1 to n modules and that may correspond to an associated peripheral device 190 1-n.

The sequence controller 110 may be synchronized to a clock 150. The purpose of the clock 150 is to trigger the sequence controller 110 to execute a non-varying sequence of instructions 200 or command list 200 (See, FIG. 2) on a precise, regulated time schedule as defined by tables in memory. The regular time schedule synchronizes the other components within the RIU emulator 100, as well as the peripherals 190, through the interface device 182 in backplane 160 to the external system. The unconditional, non-varying sequence of events is stored in IMA table memory 115 and/or RIU table memory 120.

It will be appreciated by those of ordinary skill in the art that the exemplary use of a cPCI backplane 160 herein is for simplicity of discussion due to its pervasive use in the art and should not be construed as being limiting in any way. Any suitable type of backplane or bus may be used. The backplane 160 is discussed herein as being a cPCI bus for consistency and brevity but may be any type of data bus. Other non-limiting, exemplary bus architectures may include intelligent drive electronics (IDE), PCI express (PCIe), PCI eXtensions for instrumentation (PXI) and VERSAmodule Eurocard (VME) architectures, and Universal Serial Bus (USB). Other input/output circuit card architectures, including proprietary architectures, may also be utilized if needed or desired for a particular purpose.

The sequence controller 110 communicates between an external system bus 198 through an interface device 170, such as an AFDX circuit interface card, and also communicates with the peripheral interface devices 182 via the internal bus or backplane 160. The communication to and from the RIU emulator 100 to the backplane 160 may be made over any suitable means 140. The means 140 may be one of a number of communication protocol circuits known to those of ordinary skill in the art. Non-limiting examples of means 140 includes bidirectional multiplexers, bidirectional line drivers and receivers, a hard wire connection, a router, and a wireless connection using any suitable wireless 802.11b standard such as Zigbee or Bluetooth.

In some embodiments, the RIU emulator 100 may communicate with a system computer 199 through a network 198 and interface device 170. Data received may be moved to the cPCI interface devices 182 (1-n) via the backplane 160 by the sequence controller 110. The bandwidth of the backplane 160 is dependent upon the type of bus used (e.g. cPCI, VME) and must be sized to accommodate the volume of data to be sent over the backplane 160. The bandwidth of the backplane 160 may be determined using techniques well known to those of ordinary skill in the art.

In other embodiments, types of network buses 198 that may be found useful include a Controller Area Network bus (CAN), an Ethernet bus, a local area network (LAN), wide area network (WAN), the internet and the like. The actual network architecture that one of ordinary skill in the art may use may depend on the specifications of a particular project. For example, in the field of avionics, project specifications may demand that strict timing of message traffic over the bus be maintained. As such, an architecture that supports a Time Triggered Ethernet protocol maybe required. In other applications, such as in the automotive field, a conventional CAN bus may be used.

The RIU emulator 100 may be implemented using a finite state machine concept that comprises a sequence controller 110 in operable communication with one or more memory devices. In some exemplary embodiments, a single memory may be divided into a plurality of distinct partitions implemented on one memory device.

In other embodiments a plurality of distinct physical devices may be used. In the interest of clarity, four data structures will be described as being separate "memories" or "table memories". In a non-limiting example, the four memories may comprise a "system" or an IMA table memory 115, an RIU table memory 120, an indirect memory 125, and a RIU direct memory 130.

The memories (115-130) may reside on any type of suitable memory device which may include volatile and non-volatile memory devices. Non-limiting examples of memory devices may include all types of random access memory, flash memory, read only memory (ROM), erasable electronic programmable read only memory (EEPROM), programmable logic devices, magnetic disks, optical disks and any memory devices that currently exist or may be developed in the future. The four memories may reside on the same memory device or may be separate memory devices within the RIU emulator 100. One of ordinary skill in the art will recognize that the logical and physical manifestation of the table memories are numerous and manifest. Any particular memory structure disclosed herein should not be considered limiting in any way.

The sequence controller 110 may be any suitably configured electronic controller that currently exists or may exist in the future. The sequence controller 110 may comprise a programmable logic device such as a Field Programmable Gate Array and/or an application specific integrated circuit chip (ASIC), or may be implemented using a microprocessor with application code suitable for the desired function. The sequence controller 110 may be any one or a combination of a single memory controller, multiple memory controllers, a double data rate (DDR) memory controller, a fully buffered memory controller, and any other suitable type of memory controller that may currently exist now or in the future.

The sequence controller 110, as mentioned above, ideally has minimal intelligence that may be limited to the ability to sequence instructions. In some exemplary embodiments, the sequence controller 110 manages the movement of data within the RIU emulator 100, which operates as a multiplexer/demultiplexer, using data contained in the four buffer memories (115-130). While operating, the sequence controller 110 repeatedly executes a non-varying sequence of instructions or a command list 200 (see, FIG. 2) implemented in table memories 115 and 120. The instructions may copy or "move" static data structure(s) 240 (see FIG. 4) contained in RIU direct memory 130 to and from the external bus 170.

The sequence controller 110 may also store intermediate dynamic data in indirect memory 125. Dynamic data may be characterized as data that changes over time. For example, the controller may present data to backplane 160 from RIU direct memory 130 and await a response that may be initiated by the appropriate interface device 182. The sequence controller 110 places the data from the response into the indirect memory 125 as dynamic data. A subsequent response from the interface device 182 may contain different data that may overwrite the previously saved data.

The indirect memory 125 is a temporary working memory, such as a ram buffer, that temporarily stores transient value data as it is being moved into the RIU emulator 100. The indirect memory 125 may be any type of suitable memory device currently existing or that will exist in the future.

As directed by the command list 200, the sequence controller 110 may also copy stored static data structures 240 from RIU direct memory 130 and present those data structures to the backplane 160. Further, the sequence controller 110 may present the data structures contained in RIU direct memory 130 combined with dynamic data that is contained in indirect memory 125. This may be accomplished by executing a sequence of transfers 240 (see, e.g. FIG. 2, FIG. 4) on backplane 160. Regardless of the function being executed, the specific set of transfers 240 required to complete an entire function are determined by the sequence list 230 contained in IMA Table Memory 115 and/or RIU Table Memory 120.

In other embodiments where data is to be retrieved from an interface device 170 or 180, the sequence controller 110 presents a static data structure 240 (see, FIG. 4) contained in RIU direct memory 130 to the interface device 170 or 180 via the backplane 160 and then awaits a response from backplane 160 including dynamic data received over interface device 170 or 180. Once the backplane 160 responds, the dynamic data is stored in indirect memory 125.

IMA table memory 115 is a dedicated memory containing a single, static list of commands in a particular, unvarying order. The commands in the command list 200 cause the sequence controller 110 to send and retrieve various data structures as contained in RIU direct memory 130, and optionally from indirect memory 125, over the backplane 160 which are received and acted upon by the interface device 170. The commands also store dynamic response data into the indirect memory 125.

The RIU table memory 120 is also a dedicated memory that contains a static list of commands in a particular, unvarying order that may mesh with the commands in the IMA table 115. The meshing of the commands in the IMA table 115 and the RIU table 120 may result is a single unvarying command list 200.

The commands in the RIU table 120 may be specific to one or more of the interface devices 182 (1-n). The commands in the RIU table memory 120 cause the sequence controller 110 to send and retrieve various data structures 240 contained in RIU direct memory 130, and optionally from indirect memory 125, over the backplane 160 which are intended to be received and acted upon by the interface devices 182 (1-n). The commands also cause the storing of response data from the interface devices 182 (1-n) into the indirect memory 125. The sequence and timing of the commands in table memories 115 and 120 are predefined so as to not conflict in the time domain of the backplane 160.

The table memories 115 and 120 may be deterministic in that the command list 200 being executed by the sequence controller 110 remains unaltered by any future events or data values and does not contain any conditional programming language. Therefore, while in nominal operation, the list of commands is cyclically repeated by the sequence controller 110, ad infinitum.

A simple non-limiting example of a command list 200 is presented below in Table 1 demonstrates the meshing of commands from IMA table memory 115 and RIU table memory 120. The exemplary command list 200 that is combined from table memories 115 and 120 is presented in plain English for clarity of discussion. Those of ordinary skill in the art will recognize that the sequence of commands corresponding to those of Table 1 cause a transfer of data from an internal IMA system bus 198 to an external peripheral 190 (1-n). Note the lack of conditional command language or commands performing a calculation which may result in an error.

TABLE 1

| Sequence # | Command |
| --- | --- |
| 10 | In accordance with instruction A from IMA table memory 115, transfer data structure #1 from RIU Direct Memory 130 to backplane 160 [data Structure #1 will cause the AFDX card 170 to place data on the backplane 160] |
| 11 | Store the result from backplane 160 to indirect memory 125 structure location #2 |
| 12 | In accordance with instruction P in RIU table memory 120, transfer data structure #3 from RIU Direct Memory 130 and dynamic data stored in indirect memory 125 structure #2 to backplane 160 [data structure #3 will result in causing the interface device 180x to apply applicable data to the peripheral device 190x] |

TABLE 1-continued

| Sequence # | Command |
|---|---|
| 13 | In accordance with the instruction R in RIU table memory 120, transfer data structure #4 from RIU Direct Memory 130 to backplane 160 [data structure #4 will result in causing the interface device 180x to place return data on the backplane 160] |
| 14 | Store the result from backplane 160 to indirect memory 125 structure location #5 |
| 15 | In accordance with the instruction T in IMA table memory 120, transfer structure #6 from RIU Direct Memory 130 and dynamic data stored in indirect memory 125 structure #5 to backplane 160 [data structures # 5 and #6 cause the AFDX card 170 to send the peripheral data to the system computer (not shown)] |
| 16 | Execute other commands similar to above |
| 17 | Wait for the next interrupt from clock 150 to start the sequence starting at item 10 again |

After reading the disclosure herein, one of ordinary skill in the art will appreciate that there may be commands sequenced within the command list 200 that are ineffectual because of the non-existence of certain data or the non-existence of a change in certain data. In such a case, the command would be a nullity and be executed but without effect because the data required for execution would not exist in an expected location. Although executed, the null command would not cause a terminal error or otherwise interrupt the operation of the RIU emulator 100 because there is no conditional logic that may generate such a terminal error. As such, many more commands may be included in the command list than may actually be expected to be executed with effect in any specific execution cycle of the command list. A system designer may then include commands related to a plethora of potential peripherals that would be ignored until a particular interface device 180x is added to the backplane 160.

The RIU direct memory 130 contains static data structures that are logical objects that represent data required to be transferred across the backplane 160 to cause action from an interface device 182x. Each data structure 240 contained within the RIU direct memory 130 is associated with a specific interface device 182x on the backplane 160 and allows one or more commands in the table memories 115 or 120 to be executed. A command is executed when the contents of the data structure 240 from within the RIU direct memory 130 are copied and placed on the backplane 160 destined for the interface device 182x.

As a non-limiting example, the RIU direct memory 130 may contain a sequence of cPCI data that must be sent to interface device 182x via the cPCI backplane 160 to cause the interface device 182x to transmit and/or receive data from its associated peripheral devices 190x. In the context of avionics, the RIU direct memory 130 contains what would be a "call" to the instructions that usually would be created by a device driver to cause operation of interface device 182x. The data stored in RIU Direct Memory 130 replaces the data that usually would be created and then placed on the backplane 160 by a board support package.

The data contained in data structure 240 may act like the output result of a device driver in conjunction with the associated command being executed in the IMA table memory 115. The data structure 240 may then operate a particular cPCI interface device 182x if that particular card is installed in the cPCI backplane 160.

The data structure(s) 240 are logical objects that trigger the sequence controller 110 to copy data contained in RIU Direct Memory 130 across the backplane 160 to the interface device 182x causing an action to be carried out at the interface device 180x. Each table memory data structure 240 may be modular in that it may be added to the table memory 115 or 120 by merely inserting it into the appropriate table memory. Being modular, the data structures may be debugged and certified independently and in isolation. The certified data structures 240 (e.g. data tables) may then be added to an already certified RUI emulator 100 (i.e. finite state machine) without having to then recertify it.

Figure 2:
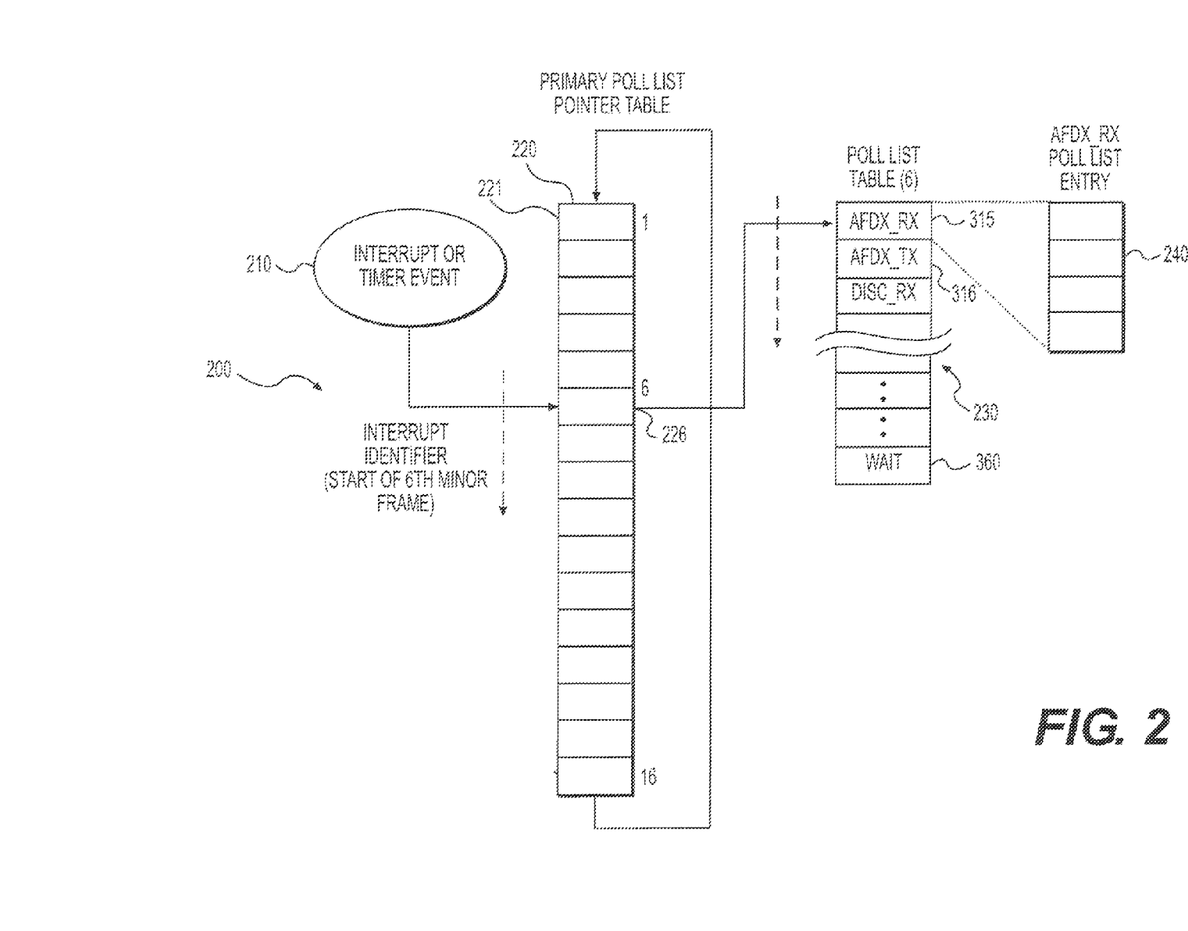
FIG. 2 is a chart illustrating the operation of the RIU emulator performing various tasks.

FIG. 2 presents a functional block diagram depicting an exemplary method 220 for executing an exemplary command list 200 repetitively. For the sake of brevity and clarity, the exemplary method herein below is limited to the details of the $6^{th}$ minor frame 226 of an exemplary command list that may be contained in the IMA table memory 115 and/or RIU table memory 120. The exemplary instructions in $6^{th}$ minor frame 226 may move data to and from the AFDX interface device 170 and moves data to and from the cPCI interface devices 182 (1-n). A more detailed breakdown of the $6^{th}$ minor frame 226 is detailed in "Poll List 'Table 6'" 230 and in FIG. 3.

The method begins at process 221 where the clock interrupt 150 triggers the sequence controller 110 to process the first instructions in the combined IMA table memory 115 and RIU table memory 120. Each minor frame 1-16 in the command list 200 is triggered by an interrupt signal 210 from the clock 150. Upon completion of the tasks in each of the minor frames 1-5 and the receipt of a next interrupt 210, the $6^{th}$ minor frame 226 is reached and triggered.

Figure 3:
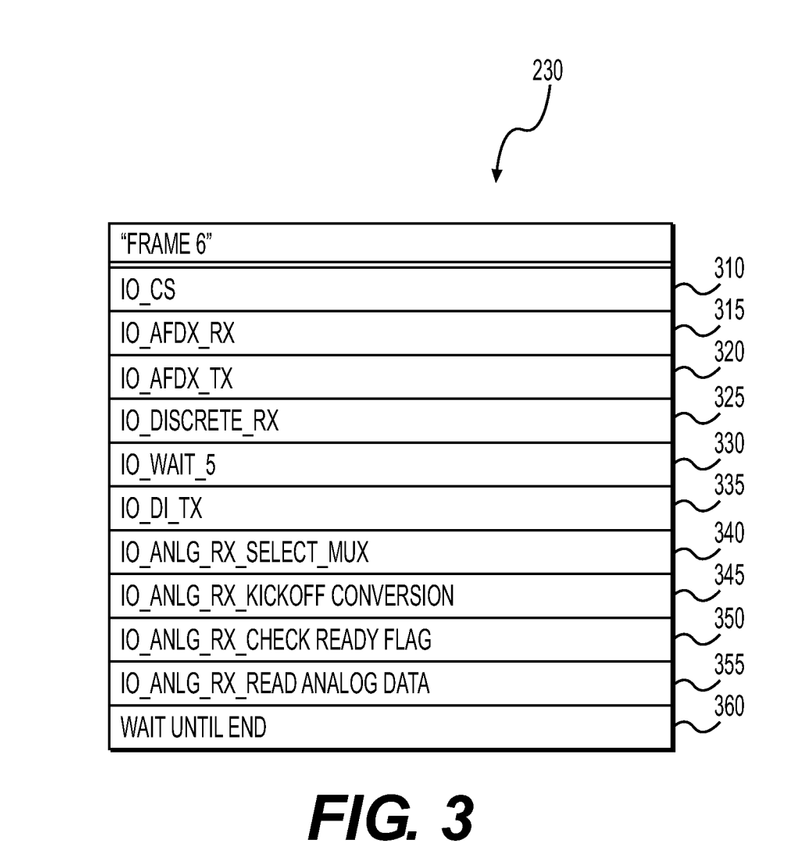
FIG. 3 is a simplified example of a combined table which incorporates both an IMA Table Memory and the RIU Table Memory in a single memory table containing the invariable list of commands.

The method within "minor frame 6" starts with the interrupt 210 which triggers the execution of the command sequence (315-360) depicted in the "Poll List Table 6" 230 of FIG. 3. Each of the instructions 315-360 of "Poll List Table 6" 230 cause the movement of the data structures 240 contained in RIU direct memory 130, which are further detailed in FIG. 4.

FIG. 3 provides a brief non-limiting example of the unvarying instructions in the minor frame 6, which is only one of the minor frames 1-16 of this exemplary command list 200. Command IO_CS 310 accounts for the time needed to switch between I/O handling algorithms. This command is optional and is only used in a microprocessor implementation. Command IO_AFDX_RX 315 causes data from AFDX interface device 170 to be moved to indirect memory 125. Command IO_AFDX_TX 320 causes data from indirect memory 125 to be moved to the AFDX interface device 170. IO_DI_RX 325 causes data to be moved from a specific peripheral interface device 180x to indirect memory 125. Command IO_WAIT_5 330 ensures 5 ms elapse from start of minor frame, ensuring a jitter-free execution of command IO_DI_TX 335. Command IO_DI_TX 335 causes data to be moved from indirect memory 125 to the specific interface device 180x. It will be appreciated by one of ordinary skill in the art that moving data from one location to another may be accomplished by merely copying the data to a new location.

The command sequence comprising IO_ANLG_RX_SELECT_MUX 340, IO_ANLG_RX_KICKOFF_CONVERSION 345, IO_ANLG_RX_READY_FLAG 350, and IO_ANLG_RX_ANALOG_DATA 355 cause analog data to be moved from an "analog" interface device 180*n* to indirect memory 125. Command WAIT_UNITL_END 360 algorithm is the last I/O servicing algorithm in any given minor frame poll list. Its purpose is to force a wait condition until the minor frame timer expires at which time the next minor frame will begin with the next clock interrupt 210.

Figure 4:
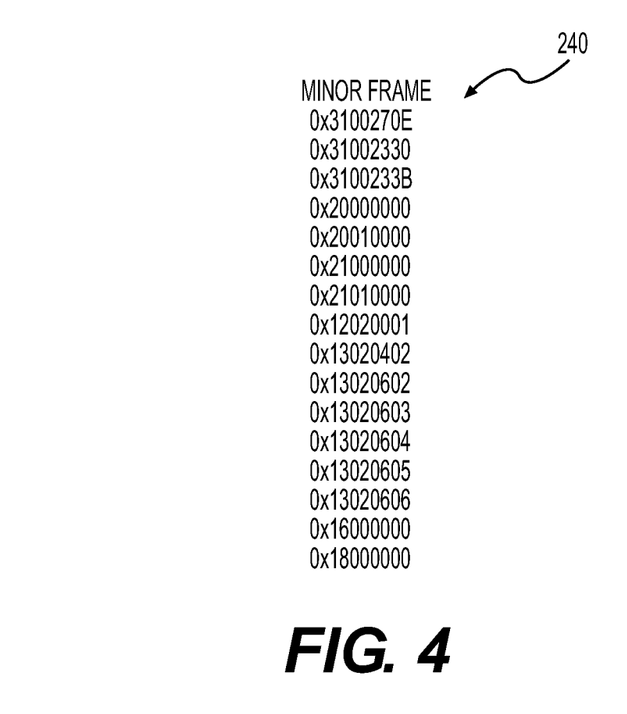
FIG. 4 is a simplified example of a detailed transfer data list of instruction executing a servicing algorithm.

FIG. 4. presents an example of a data structure 240 contained in a Poll List within a RIU direct memory 130. Each entry is the data required by a specific interface device 170 or 180 to cause its operation. Each entry is digital data as is necessary to transmit across the backplane 160 to cause operation of a specific interface device 170 or 180. The detailed data structure 240 example in the AFDX_RX Poll List moves data from the AFDX interface device 170 to indirect memory 125.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment or exemplary embodiments. It should be understood that various changes may be made in the function and arrangement of elements described in an exemplary embodiment without departing from the scope of the invention as set forth in the appended claims and the legal equivalents thereof

What is claimed is:

1. A remote interface unit (RIU) emulator comprising:
a non-transitory machine-readable memory device containing a first data structure and a second data structure,
the first data structure comprising a single, static, list of unconditional commands 1 through n, each unconditional command in the list of unconditional commands excluding conditional programming language, each unconditional command in the list of unconditional commands to be cyclically executed in a non-varying order of execution comprising the execution of command 1 and continuing sequentially through the execution of command n and returning thereafter to the execution of command 1,
and the second data structure comprising interface device specific data comprising a logical object required by at least one unconditional command 1 through n; and
a sequence controller that receives a synchronization input comprising a clock signal, the sequence controller having an operable communication path with the non-transitory machine-readable memory device, wherein the sequence controller further executes each unconditional command in the said non-varying order of execution based upon the synchronization input, wherein the execution of at least one of commands 1 through n causes the sequence controller to send the interface device specific data to an interface device that is connected to the RIU emulator and that is associated with the interface device specific data, said interface device specific data in turn causing the interface device to perform a function unique to the interface device.

2. The RIU emulator of claim 1, wherein the machine-readable memory device comprises two or more discrete memory devices.

3. The RIU emulator of claim 2, further comprising a third independent data structure residing within the two or more memory devices, which stores transient value data associated with the interface device, wherein the interface device specific data causes the interface device to generate the transient value data, the sequence controller causing said transient value data to be stored in the third independent data structure.

4. The RIU emulator of claim 3, wherein the third data structure further stores constant value data associate with the interface device.

5. The RIU of claim 1 wherein the interface device specific data resident within the second data structure is static, and wherein at least one of the commands 1 through n of the first data structure cause the sequence controller to call to the second data structure to retrieve a non-existent interface device specific data logical object in reference to an interface device that is not currently associated with the RIU emulator.

6. A method comprising:
receiving synchronization input comprising a clock interrupt signal;
cyclically executing, in response to the clock interrupt signal, a set of unconditional commands 1 through n in a non-varying order of execution comprising the execution of command 1 and continuing sequentially through the execution of command n and returning thereafter to the execution of command 1, all of the commands in the set of commands comprising unconditional commands, and all of the unconditional commands excluding conditional programming language; and
in response to the execution of one of the commands 1 through n, copying at least a first logical data structure from a memory device to a communication and sending the first logical data structure through the communication bus to a remote electronic device, wherein the first logical data structure causes the remote electronic device to perform a function that is specific to the remote electronic device, wherein the first logical data structure contains data required by the remote electronic device to perform the function.

7. The method of claim 6, further comprising:
in response to the remote electronic device performing the function, generating at the remote electronic device at least a second logical data structure and copying the second logical data structure from the communication bus to the memory device as a result of the cyclically executing the set of unconditional commands, wherein the second logical data structure contains data from the remote electronic device, the method further comprising in response to the execution of another of the commands 1 through n, attempting to copy and send a third, non-existent logical data structure from the memory device to a non-existent remote electronic device, wherein as a result of said attempted copying and sending, the execution of the another of the commands 1 through n is a nullity.

8. The method of claim 6, wherein the set of unconditional commands are executed continuously.

9. The method of claim 7, wherein at least one of the first and second logical data structures causes analog data to be moved from an analog electronic device to the memory device.

10. A system for interfacing a first digital component with a second digital component comprising:

a buffer memory that stores a plurality of data values being transferred between the first digital component and the second digital component;

a first data structure that stores data specific to the second digital component;

a second data structure that stores a set of unconditional commands 1 through n, each unconditional command 1 through n excluding conditional programming language;

a processor that cyclically executes each of the unconditional commands in the set of unconditional commands in a non-varying and cyclic order of execution comprising the execution of command 1 and continuing sequentially through the execution of command n and returning thereafter to the execution of command 1, wherein the execution of at least one of the commands 1 through n causes the processor to copy the plurality of data values from the buffer memory to the second digital component, wherein the execution of the at least one of the set of unconditional commands copies and sends the data specific to the second digital component stored in the first data structure to the second digital component to control the second digital component to perform a function specific to the second digital component with the use of the data specific to the second digital component.

11. The system of claim 10, wherein the first digital component is a computing device.

12. The system of claim 11, wherein the first digital component is a flight data system.

13. The system of claim 10, wherein the second digital component is an interface device configured to interface with a peripheral device.

14. The system of claim 13, wherein the second digital component is an actuator.

15. The system of claim 10, wherein the processor receives the plurality of data values from the first digital component over a data bus operating a protocol with timing constraints, and wherein the system further comprises a synchronization clock initiates the protocol with timing constraints and communicates with the processor to cause the processor to execute the commands 1 through n in the said non-varying and cyclic order of execution.

16. The system of claim 10, wherein the processor copies the plurality of data values to the second digital component via a peripheral component interconnect (PCI) bus.

17. The system of claim 10, wherein the processor, the first data structure, and the second data structure comprise a finite state machine.

18. The system of claim 10, wherein the processor copies the plurality of data values to the second digital component via a compact peripheral component interconnect (cPCI) bus.

19. The system of claim 10, wherein the processor copies the plurality of data values to the second digital component via a VERSAmodule Eurocard (VME) bus.

20. The system of claim 10, wherein the processor copies the plurality of data values to the second digital component via a PCI extension for instrumentation (PXI) bus.

* * * * *